No. 894,972. PATENTED AUG. 4, 1908.
P. C. M. MONTBARBON.
AUTOMOBILE GOGGLES.
APPLICATION FILED SEPT. 19, 1907.

WITNESSES:

INVENTOR,
PHILIPPE CHARLES MAURICE MONTBARBON,
by van Oldeneel & Schoenlank
Attorneys.

UNITED STATES PATENT OFFICE.

PHILIPPE CHARLES MAURICE MONTBARBON, OF PARIS, FRANCE.

AUTOMOBILE-GOGGLES.

No. 894,972.   Specification of Letters Patent.   Patented Aug. 4, 1908.

Application filed September 19, 1907. Serial No. 393,621.

*To all whom it may concern:*

Be it known that I, PHILIPPE CHARLES MAURICE MONTBARBON, a citizen of France, residing at Paris, in the said Republic, have invented new and useful Automobile-Goggles, and do hereby declare the following to be a full, clear, and exact description of the same.

The present invention has for its object a device for protecting the eyes of the drivers of automobile vehicles, from rain, mud, dust and flies or other foreign bodies.

This device, the advantages of which increase with the increase of speed of the vehicle, is applicable to the spectacles or goggles used by the drivers of motor vehicles.

The device, broadly stated, consists in the combination of a front opaque screen and a rear transparent screen within each cylinder of the goggles, each of the screens being mounted upon a wall of the cylinder containing it, the lower edge of each opaque screen being situated in front of and at a certain horizontal distance from the upper edge of the transparent screen, a free space remaining between the two edges in question sufficient to afford a perfect field of vision to the eye of the driver of the vehicle. By the said combination of these two screens, foreign bodies are prevented from reaching the driver's eye, as the front screen imparts sufficient deviation to said bodies to cause them to fall on the rear screen, which is arranged to deflect them away from the eye.

In certain cases, which are, however, very rare in practice, a foreign body might pass between the two screens, but in such case (owing to the action of the opaque front screen) it will have lost much of its velocity, so that, usually, it is no longer able to reach the eye; nevertheless, it is advisable, when the eye is very close to the front screen, as in the case of goggles, to add a supplementary screen to each cylinder or tube of the goggles, arranged closer to the transparent rear screen but still in front of and above this latter.

Figure 1:
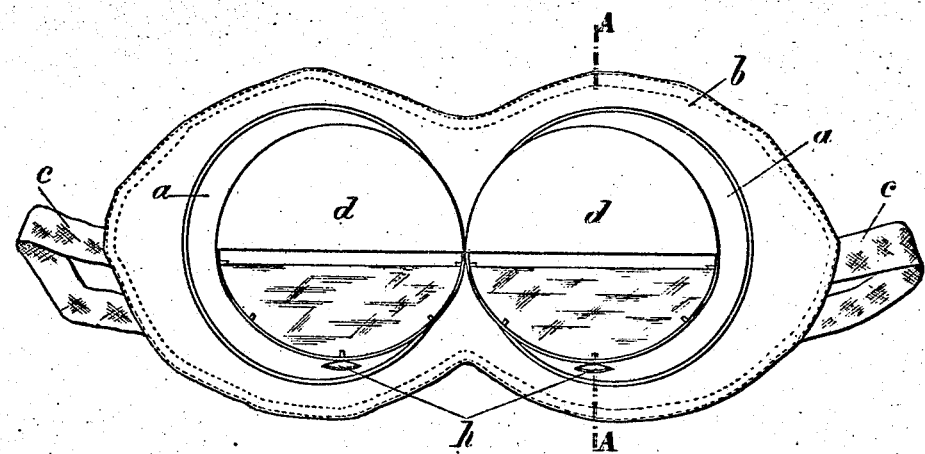
Figure 2:
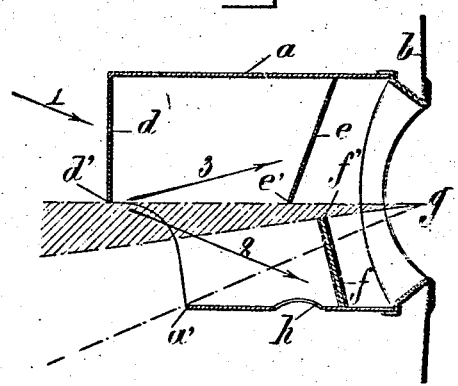

In order to render the invention readily and clearly intelligible, the device forming the object of the invention is illustrated, by way of example, in the accompanying drawing, in which Figure 1 is a view, from the front, of a pair of goggles embodying the invention; Fig. 2 is a longitudinal section, on the line A—A of Fig. 1, through one cylinder of the goggles.

The goggles are provided with two similar opaque cylinders $a$, which are, if desired, united in such a manner as to be convergent, as shown. The rear portions of the said cylinders, which come against the face, are provided, as in the goggles hitherto used, with a covering $b$ of skin, silk or other fabric and with elastic cords or bands, $c$, for fixing the goggles in place.

The front end of each of the cylinders or tubes is partially closed by an opaque screen $d$ extending over the upper half section of the cylinder and leaving the lower half section free. As regards the lower half section of each cylinder, this (as shown in Fig. 2) is cut away in such a manner that the lower edge $a'$ of each cylinder is in retreat by a desired amount relatively to the lower edge $d'$ of the screen $d$. Each of the cylinders also preferably contains a supplementary and opaque upper screen $e$ and of the same dimensions as screen $d$. The screen $e$ may be disposed obliquely, relatively to the screen $d$, or otherwise. In addition to the upper screen or screens, there is fitted, in the lower section of each cylinder, a glass screen $f$, obliquely or otherwise relatively to the axis of the cylinder $a$, and which leaves between its upper edge $f'$ and the lower edge $e'$ of the screen $e$ a certain free space so that if the eye of the driver is located at $g$ (Fig. 2) a field of vision, or of perfect visibility, comprised in the angle $e'\ g\ f'$, is afforded under all weather conditions and is absolutely sufficient under all circumstances arising in driving the vehicle. This field of vision may be extended in good weather, and especially when the vehicle is running at a moderate speed, and, in such case, it is comprised in the angle $d'\ g\ a'$, the condition of the glasses $f$ then permitting of the passage of visual rays.

The action of the protecting device, in the case of rain, for example, is as follows: The rain striking the screen $d$ as indicated by the arrow 1 or in a more or less oblique direction, is arrested and flows in drops to the lower edge $d'$; thence carried by the air, the drops become detached and, upon falling, as shown by the arrow 2, strike the surface of the glass $f$, flows over this surface and falls into the lower part of the cylinder from which it is able to escape to the exterior through an opening $h$ specially provided for this purpose. In cases, which are, however, very rare, in which the drop follows the path indicated by the arrows 3, it is arrested by the screen $e$ and slides to the lower edge $e'$ thereof; then the drop falls by its weight onto the front face of the glass $f$ (the air having undergone loss of pressure and experiencing a counter pressure in the sight opening, between $e'$ and $f'$, loses its velocity) and the drop finally flows through the openings $h$. In another rare case in which the drop might pass through the space $e'$ $f'$, it would have so little velocity that it would fail to reach the eye.

In manner similar to the arresting of drops of rain, the dust, insects and other foreign bodies entering through the front opening of the cylinders $a$ are arrested by the glasses $f$.

What I claim is:

1. Goggles for drivers of automobiles and other vehicles, and comprising cylinders, a front opaque screen and a transparent rear screen within each cylinder and each suitably fitted to the walls of the cylinder, the lower edge of the front screen being situated in front and at a certain horizontal distance from the upper edge of the rear screen and with a free space between the edges mentioned sufficient to afford a field of vision, between the horizontal planes of the said edges, to the eye of the driver situated behind the rear screen.

2. Goggles for drivers of automobiles and other vehicles, and comprising cylinders, an opaque screen mounted on the upper part of each cylinder at the front thereof, a transparent screen within each cylinder and mounted on the lower part thereof near its rear and with a free space between the edges of the two specified screens sufficient to afford a field of vision to the eye of the driver situated behind the rear screen, and an auxiliary opaque screen within each cylinder and arranged in front of and above the transparent screen aforesaid.

In testimony whereof, I have signed my name to this specification in the presence of two subscribing witnesses.

PHILIPPE CHARLES MAURICE MONTBARBON.

Witnesses:
  ANDRÉ BORDILLON,
  EUGÈNE PICHON.